3,043,844
LOWER-ALKYL 1-[3-(MONOCARBOCYCLIC-ARYL)-2-PROPENYL]-4-PHENYL-4-PIPERIDYL KETONES AND THEIR PREPARATION
Bill Elpern, Walnut Creek, Calif., assignor to Sterling Drug Inc., New York, N.Y., a corporation of Delaware
No Drawing. Filed May 12, 1958, Ser. No. 734,406
9 Claims. (Cl. 260—294.7)

This invention relates to compositions of matter of the class of substituted piperidines and to a process for their preparation.

The invention here resides in the concept of a composition having a molecular structure in which a 3-(monocarbocyclic-aryl)-2-propenyl radical is attached to the nitrogen atom of the piperidine ring of lower-alkyl 4-phenyl-4-piperidyl ketones and in a process for physically embodying such concept.

The physical embodiments of my invention have been tested by standard pharmacological evaluation procedures in rats and found to possess analgesic activity. They also have anti-tussive activity, as determined by standard pharmacological evaluation procedures in cats.

Among the compounds of my invention are those which in free base form have the structural Formula I

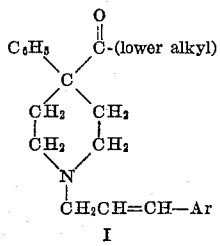

I where Ar is a monocarbocyclic-aryl radical having six ring-carbon atoms. These compounds also can be named as 1-[3-(monocarbocyclic-aryl)-2-propenyl]-4-phenyl-4-(lower-alkanoyl)piperidines.

The term "lower-alkyl," as used herein, means alkyl radicals having from one to six carbon atoms, inclusive, and is illustrated by methyl, ethyl, n-propyl, isopropyl, n-butyl, isobutyl, 2-butyl, n-amyl, n-hexyl, and the like.

The term "monocarbocyclic-aryl," as used herein, means aryl radicals having six ring-carbon atoms or, in other words, aryl radicals of the benzene series, and is illustrated by the unsubstituted phenyl radical and phenyl radicals bearing substituents, preferably one to three, illustrated by nitro, amino, (lower-alkyl)amino, (lower-alkanoyl)amino, lower-alkoxy, lower-alkyl, lower-alkylmercapto, lower-alkylsulfonyl, hydroxy, halo, and the like. Furthermore, these substituents can be in any of the available positions of the phenyl nucleus, and where more than one substituent, they can be the same or different and they can be in any of the various position combinations relative to each other. The (lower-alkyl)amino, (lower-alkanoyl)amino, lower-alkoxy, lower-alkyl, lower-alkylmercapto and lower-alkylsulfonyl substituents each have preferably from one to six carbon atoms which can be arranged as straight or branched chains.

The lower-alkyl 1-[3-(monocarbocyclic-aryl)-2-propenyl]-4-phenyl-4-piperidyl ketones are prepared by reacting a lower-alkyl 4-phenyl-4-piperidyl ketone with a 3-(monocarbocyclic-aryl)-2-propenylating agent, said agent being preferably a 3-(monocarbocyclic-aryl)-2-propenyl ester of an acid selected from the group consisting of a strong inorganic acid and an organic sulfonic acid. The reaction is carried out generally by heating, at a temperature between about 50° C. and 150° C., the lower-alkyl 4-phenyl-4-piperidyl ketone with the 3-(monocarbocyclic-aryl)-2-propenyl ester, preferably the bromide, in the presence or absence of a suitable solvent, but preferably in the presence of a solvent such as a lower-alkanol. Illustrative of the reaction are: the preparation of ethyl 1-[3-(4-aminophenyl)-2-propenyl]-4-phenyl-4-piperidyl ketone by heating ethyl 4-phenyl-4-piperidyl ketone with 3-(4-aminophenyl)-2-propenyl bromide; and the preparation of n-propyl 1-(3-phenyl-2-propenyl)-4-phenyl-4-piperidyl ketone by heating n-propyl 4-phenyl-4-piperidyl ketone with 3-phenyl-2-propenyl chloride. These preparations are carried out preferably in refluxing n-butanol with stirring in the presence of an alkaline agent such as sodium carbonate to neutralize the hydrogen halide formed by the reaction. The products are isolated in free base form or in the form of their acid-addition salts.

My lower-alkyl 1-[3-(monocarbocyclic-aryl)-2-propenyl]-4-phenyl-4-piperidyl ketones are useful in the free base form or in the form of acid-addition salts, and both forms are within the purview of the invention, and, in fact, are considered to be one and the same invention. The acid-addition salts are simply a more convenient form for use; and, in practice, use of the salt form inherently amounts to use of the base form. As used in the appended claims, unless specifically designated otherwise, the term "lower-alkyl 1-[3-(monocarbocyclic-aryl)-2-propenyl]-4-phenyl-4-piperidyl ketone" means both the free base form and the acid-addition salt form of the molecular structure recited. The acids which can be used to prepare the acid-addition salts are preferably those which produce, when combined with the free base, pharmacologically acceptable salts, that is, salts whose anions are relatively innocuous to the animal organism in pharmacological doses of the salts, so that the beneficial physiological properties inherent in the free base are not vitiated by side effects ascribable to the anions; in other words, the latter do not substantially affect the pharmacological properties inherent in the cations. In practicing my invention, I found it convenient to employ the hydrochloride salt. However, other appropriate pharmacologically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate and quinate, respectively.

The acid-addition salts are prepared either by dissolving the free base in aqueous solution containing the appropriate acid and isolating the salt by evaporating the solution, or by reacting the free base and acid in an organic solvent, in which case the salt separates directly or can be obtained by concentration of the solution.

Although pharmacologically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a pharmacologically acceptable salt by ion exchange procedures.

The molecular structures of the compounds of my invention are established by their mode of synthesis and corroborated by the correspondence of calculated and found values for the elementary analyses for representative examples.

The following examples will further illustrate the invention without, however, limiting it thereto.

Example 1

*Lower-alkyl 1-benzyl-4-phenyl-4-piperidyl ketones.*—The preparation of these intermediate compounds is illustrated by the following preparation of ethyl 1-benzyl-4-phenyl-4-piperidyl ketone: A solution of ethyl magnesium bromide was prepared from 327 g. of ethyl bromide and 72.9 g. of magnesium in two liters of ether. 1-benzyl-4-cyano-4-phenylpiperidine hydrochloride, 312.8 g., was converted into its free base and taken up in one liter of toluene. The toluene solution was added to the Grignard reagent and the resultant mixture was subjected to downward distillation until the ether had been removed and the still-head temperature had reached 105° C. During this time the mixture turned gray-green and a solid separated. After the mixture had been refluxed an additional four hours, it was allowed to stand overnight at room temperature and then poured into a mixture of 600 ml. of concentrated hydrochloric acid and two liters of water. The acidic solution was heated for three hours on a steam bath, cooled and made basic with ammonium hydroxide. Two liters of ether were added to the basic mixture which was stirred until all of the solid dissolved. The ether layer was separated; the ether was removed from the organic layer by distilling in vacuo; and the residual oil was subjected to an azeotropic distillation with a small quantity of benzene. The residual oil was taken up in ether, filtered free of a small quantity of solid and concentrated in vacuo again to remove the ether. There was thus obtained 289.6 g. (94.3% theory) of ethyl 1-benzyl-4-phenyl-4-piperidyl ketone, an oil. On standing, this produce solidified.

Ethyl 1-benzyl-4-phenyl-4-piperidyl ketone was converted into its hydrochloride salt by treating its ether solution with a solution of hydrogen chloride in ether, collecting the precipitate and recrystallizing the precipitate several times from ethanol-ether and once from isopropanol. There was thus obtained ethyl 1-benzyl-4-phenyl-4-piperidyl ketone hydrochloride, M.P. 226.0–229.6° C. (corr.).

*Analysis.*—Calcd. for $C_{21}H_{25}NO \cdot HCl$: C, 73.35; H, 7.62; Cl, 10.32. Found: C, 73.39; H, 7.34; Cl, 10.28.

Other lower-alkyl 1-benzyl-4-phenyl-4-piperidyl ketones can be prepared following the above procedure for the preparation of ethyl 1-benzyl-4-phenyl-4-piperidyl ketone using the appropriate lower-alkyl magnesium halide in place of ethyl magnesium bromide as follows: methyl 1-benzyl-4-phenyl-4-piperidyl ketone using methyl magnesium iodide; n-propyl 1-benzyl-4-phenyl-4-piperidyl ketone using n-propyl magnesium bromide; isobutyl 1-benzyl-4-phenyl-4-piperidyl ketone using isobutyl magnesium bromide; n-hexyl 1-benzyl-4-phenyl-4-piperidyl ketone using n-hexyl magnesium chloride; and the like.

Example 2

*Lower-alkyl 4-phenyl-4-piperidyl ketones.*—The preparation of these intermediate compounds is illustrated by the following preparation of ethyl 4-phenyl-4-piperidyl ketone: A solution containing 289.6 g. of ethyl 1-benzyl-4-phenyl-4-piperidyl ketone in a mixture of one liter of absolute ethanol and 400 cc. of acetic acid was treated with hydrogen under pressure using 40 g. of 10% palladium on charcoal to yield the corresponding debenzylated compound. This catalytic reduction was carried out at 66° C. and was complete in about six and one-half hours. The catalyst was removed by filtration and the filtrate concentrated by distilling in vacuo. The remaining oil was extracted with ether; the ether solution was dried over anhydrous sodium sulfate; the ether was removed by distillation in vacuo; and the residual oil was distilled in vacuo whereupon there was obtained 85 g. of light yellow oil distilling at 95–130° C. at 0.03 mm. Redistillation of this oil yielded 80.7 g. (40% yield) of ethyl 4-phenyl-4-piperidyl ketone, B.P. 96–106° C. at 0.03 mm., $n_D^{26°} = 1.5430$. The hydrochloride of this compound melted at 208.8–211.0° C. (corr.) when recrystallized twice from ethyl acetate-ethanol.

*Analysis.*—Calcd. for $C_{14}H_{19}NO \cdot HCl$: C, 66.24; H, 7.94; Cl, 13.97. Found: C, 65.96; H, 7.79; Cl, 13.72.

Other lower-alkyl 4-phenyl-4-piperidyl ketones can be prepared following the above procedure for the preparation of ethyl 4-phenyl-4-piperidyl ketone using the appropriate lower-alkyl 1-benzyl-4-phenyl-4-piperidyl ketone in place of ethyl 1-benzyl-4-phenyl-4-piperidyl ketone as follows: methyl 4-phenyl-4-piperidyl ketone using methyl 1-benzyl-4-phenyl-4-piperidyl ketone; n-propyl 4-phenyl-4-piperidyl ketone using n-propyl 1-benzyl-4-phenyl-4-piperidyl ketone; isobutyl 4-phenyl-4-piperidyl ketone using isobutyl 1-benzyl-4-phenyl-4-piperidyl ketone; n-hexyl 4-phenyl-4-piperidyl ketone using n-hexyl 1-benzyl-4-phenyl-4-piperidyl ketone; and the like.

Example 3

*Lower-alkyl 1-[3-(monocarbocyclic-aryl)-2-propenyl]-4-phenyl-4-piperidyl ketones.*—The preparation of these compounds is illustrated by the following preparation of ethyl 1-(3-phenyl-2-propenyl)-4-phenyl-4-piperidyl ketone in free base and acid-addition salt forms: A mixture containing 5.4 g. of ethyl 4-phenyl-4-piperidyl ketone, 4.93 g. of 3-phenyl-2-propenyl bromide (cinnamyl bromide), 50 cc. of n-butanol and 6 g. of sodium carbonate was refluxed for twenty-four hours, cooled, and filtered. The filtrate was concentrated in vacuo; the remaining oil was dissolved in ether; Dry Ice was added to the ether solution; and the solution was filtered again. A solution of hydrogen chloride in ether was added to the filtrate and the resulting precipitate was recrystallized twice from ethyl acetate to yield 4.7 g. (51% yield) of ethyl 1-(3-phenyl-2-propenyl)-4-phenyl-4-piperidyl ketone as its hydrochloride, M.P. 188.0–191.2° C. (corr.).

*Analysis.*—Calcd. for $C_{23}H_{27}NO \cdot HCl$: C, 74.69; H, 7.63; Cl, 9.58. Found: C, 74.74; H, 7.73; Cl, 9.40.

Following the above procedure using hydrobromic acid, sulfamic acid, citric acid or methanesulfonic acid in place of hydrogen chloride, there is obtained, respectively, ethyl 1-(3-phenyl-2-propenyl)-4-phenyl-4-piperidyl ketone hydrobromide, ethyl 1-(3-phenyl-2-propenyl)-4-phenyl-4-piperidyl ketone sulfamate, ethyl 1-(3-phenyl-2-propenyl)-4-phenyl-4-piperidyl ketone citrate or ethyl 1-(3-phenyl-2-propenyl)-4-phenyl-4-piperidyl ketone methanesulfonate.

Following the above procedure but using 3-phenyl-2-propenyl chloride, 3-phenyl-2-propenyl iodide or 3-phenyl-2-propenyl para-toluenesulfonate in place of 3-phenyl-2-propenyl bromide, the same product is obtained.

Ethyl 1-(3-phenyl-2-propenyl)-4-phenyl-4-piperidyl ketone in the form of its free base is obtained by dissolving a sample of the above-described hydrochloride in water, treating the aqueous solution with sodium hydroxide solution, extracting the liberated base with ether, drying the ether extract with anhydrous sodium sulfate and evaporating the ether solution to dryness in vacuo.

Pharmacological evaluation of ethyl 1-(3-phenyl-2-propenyl)-4-phenyl-4-piperidyl ketone hydrochloride in aqueous solution administered subcutaneously by the rat thermal stimulus method of Bass and Vander Brook has shown that this compound is approximately four times as active an analgesic as meperidine hydrochloride. Ethyl 1-(3-phenyl-2-propenyl)-4-phenyl-4-piperidyl ketone hydrochloride in aqueous solution when administered intraperitoneally to anesthetized cats subjected to mechanical stimulation according to known procedures to induce coughing was found to possess antitussive activity at a dose level of 25 mg. per kg. This compound was found to have an acute toxicity in rats of 12±1 mg. per kg. when administered intravenously in aqueous solution.

Other representative lower-alkyl 1-[3-(monocarbocyclic-aryl)-2-propenyl]-4-phenyl-4-piperidyl ketones that can be obtained following the above procedure for the preparation of ethyl 1-[3-phenyl-2-propenyl)-4-phenyl-4-piperidyl ketone using the appropriate lower-alkyl 4-phenyl-4-piperidyl ketone and 3-(monocarbocyclic-aryl)-2-propenyl halide are the following compounds of Examples 4–19, inclusive. These compounds can be isolated in their free base form or in the form of their acid-addition salts, preferably their hydrochlorides, as illustrated.

*Example 4*

Methyl 1-(3-phenyl-2-propenyl)-4-phenyl-4-piperidyl ketone hydrochloride is obtained following the procedure described in Example 3 using methyl 4-phenyl-4-piperidyl ketone and 3-phenyl-2-propenyl bromide.

*Example 5* n-Propyl 1-(3-phenyl-2-propenyl)-4-phenyl-4-piperidyl ketone hydrochloride is obtained following the procedure described in Example 3 using n-propyl 4-phenyl-4-piperidyl ketone and 3-phenyl-2-propenyl bromide.

*Example 6*

Isobutyl 1-(3-phenyl-2-propenyl)-4-phenyl-4-piperidyl ketone hydrochloride is obtained following the procedure described in Example 3 using isobutyl 4-phenyl-4-piperidyl ketone and 3-phenyl-2-propenyl bromide.

*Example 7* n-Hexyl 1-(3-phenyl-2-propenyl)-4-phenyl-4-piperidyl ketone hydrochloride is obtained following the procedure described in Example 3 using n-hexyl 4-phenyl-4-piperidyl ketone and 3-phenyl-2-propenyl bromide.

*Example 8*

Ethyl 1-[3-(4-nitrophenyl)-2-propenyl]-4-phenyl-4-piperidyl ketone hydrochloride is obtained following the procedure described in Example 3 using ethyl 4-phenyl-4-piperidyl ketone and 3-(4-nitrophenyl)-2-propenyl bromide.

*Example 9*

Ethyl 1-[3-(4-aminophenyl)-2-propenyl]-4-phenyl-4-piperidyl ketone hydrochloride is obtained following the procedure described in Example 3 using ethyl 4-phenyl-4-piperidyl ketone and 3-(4-aminophenyl)-2-propenyl bromide. Alternatively, this compound can be prepared by treating the corresponding 1-[3-(4-nitrophenyl)-2-propenyl] compound with a reducing agent effective to reduce nitro groups to amino groups.

*Example 10*

Ethyl 1-[3-(4-acetylaminophenyl)-2-propenyl]-4-phenyl-4-piperidyl ketone hydrochloride is obtained following the procedure described in Example 3 using ethyl 4-phenyl-4-piperidyl ketone and 3-(4-acetylaminophenyl)-2-propenyl bromide. Alternatively, this compound can be obtained by treating the corresponding 1-[3-(4-aminophenyl)-2-propenyl] compound with acetic anhydride or acetyl chloride.

*Example 11*

Ethyl 1-[3-(4-n-butylaminophenyl)-2-propenyl]-4-phenyl-4-piperidyl ketone hydrochloride is obtained following the procedure described in Example 3 using ethyl 4-phenyl-4-piperidyl ketone and 3-(4-n-butylaminophenyl)-2-propenyl bromide.

*Example 12*

Ethyl 1-[3-(4-methoxyphenyl)-2-propenyl]-4-phenyl-4-piperidyl ketone hydrochloride is obtained following the procedure described in Example 3 using ethyl 4-phenyl-4-piperidyl ketone and 3-(4-methoxyphenyl)-2-propenyl chloride.

*Example 13* n-Butyl 1-[3-(3-ethoxyphenyl)-2-propenyl]4-phenyl-4-piperidyl ketone hydrochloride is obtained following the procedure described in Example 3 using n-butyl 4-phenyl-4-piperidyl ketone and 3-(3-ethoxyphenyl)-2-propenyl bromide.

*Example 14*

Methyl 1-[3-(3,4-dimethoxyphenyl)-2-propenyl]-4-phenyl-4-piperidyl ketone hydrochloride is obtained following the procedure described in Example 3 using methyl 4-phenyl-4-piperidyl ketone and 3-(3,4-dimethoxyphenyl)-2-propenyl iodide.

*Example 15* n-Propyl 1-[3-(4-n-butylmercaptophenyl)-2-propenyl]-4-phenyl-4-piperidyl ketone hydrochloride is obtained following the procedure described in Example 3 using n-propyl 4-phenyl-4-piperidyl ketone and 3-(4-n-butylmercaptophenyl)-2-propenyl bromide.

*Example 16*

Ethyl 1-[3-(4-n-butylsulfonylphenyl)-2-propenyl]-4-phenyl-4-piperidyl ketone hydrochloride is obtained following the procedure described in Example 3 using ethyl 4-phenyl-4-piperidyl ketone and 3-(4-n-butylsulfonylphenyl)-2-propenyl bromide.

*Example 17*

Ethyl 1-[3-(4-isopropylphenyl)-2-propenyl]-4-phenyl-4-piperidyl ketone hydrochloride is obtained following the procedure described in Example 3 using ethyl 4-phenyl-4-piperidyl ketone and 3-(4-isopropylphenyl)-2-propenyl chloride.

*Example 18*

Ethyl 1-[3-(2,4-dichlorophenyl)-2-propenyl]-4-phenyl-4-piperidyl ketone hydrochloride is obtained following the procedure described in Example 3 using ethyl 4-phenyl-4-piperidyl ketone and 3-(2,4-dichlorophenyl)-2-propenyl chloride.

*Example 19*

Ethyl 1-[3-(4-hydroxyphenyl)-2-propenyl]-4-phenyl-4-piperidyl ketone hydrochloride is obtained following the procedure described in Example 3 using ethyl 4-phenyl-4-piperidyl ketone and 3-(4-hydroxyphenyl)-2-propenyl bromide.

My lower-alkyl 1-[3-(monocarbocyclic-aryl)-2-propenyl]-4-phenyl-4-piperidyl ketones can be formulated in the manner conventional for potent analgesics and antitussive agents. For example, they can be formulated in liquid preparations, e.g., aqueous or aqueous-ethanol menstruum, or in solid form, e.g., as tablets or powders. The tablet formulations can be prepared using conventional excipients; and the powder can be formulated in capsule form. These preparations can be administered orally or, in the case of the aqueous preparations of the compounds having analgesic activity, intramuscularly or intraveneously. For use as antitussive agents the compounds can be prepared for oral administration as syrups or elixirs by combining the compounds with usual liquid diluents or carriers including, if desired, sweetening and flavoring agents.

I claim:

1. The lower-alkyl 1-[3-(monocarbocyclic-aryl)-2-propenyl]-4-phenyl-4-piperidyl ketone in free base form.

2. Acid-addition salts of the lower alkyl 1-[3-(monocarbocyclic-aryl)-2-propenyl]-4-phenyl-4-piperidyl ketone.

3. The lower-alkyl 1-(3-phenyl-2-propenyl)-4-phenyl-4-piperidyl ketone in free base form.

4. Acid-addition salts of the lower-alkyl 1-(3-phenyl-2-propenyl)-4-phenyl-4-piperidyl ketone.

5. Ethyl 1-(3-phenyl-2-propenyl)-4-phenyl-4-piperidyl ketone.

6. Ethyl 1-(3-phenyl-2-propenyl)-4-phenyl-4-piperidyl ketone hydrochloride.

7. The process of preparing a lower-alkyl 1-[3-(monocarbocyclic-aryl)-2-propenyl]-4-phenyl-4-piperidyl ketone which comprises reacting lower-alkyl 4-phenyl-4-piperidyl ketone with 3-(monocarbocyclic-aryl)-2-propenyl halide.

8. The process of preparing a lower-alkyl 1-(3-phenyl-2-propenyl)-4-phenyl-4-piperidyl ketone which comprises reacting lower-alkyl 4-phenyl-4-piperidyl ketone with 3-phenyl-2-propenyl halide.

9. The process of preparing ethyl 1-(3-phenyl-2-propenyl)-4-phenyl-4-piperidyl ketone which comprises reacting ethyl 4-phenyl-4-piperidyl ketone with 3-phenyl-2-propenyl bromide.

References Cited in the file of this patent

UNITED STATES PATENTS

| | | |
|---|---|---|
| 2,248,018 | Eisleb | July 1, 1941 |
| 2,824,875 | Elpern | Feb. 25, 1958 |